US 6,668,753 B2

(12) United States Patent
Hebrank

(10) Patent No.: US 6,668,753 B2
(45) Date of Patent: Dec. 30, 2003

(54) METHODS AND APPARATUS FOR DELIVERING FLUID TO EGG INJECTION DEVICES

(75) Inventor: John H. Hebrank, Durham, NC (US)

(73) Assignee: Embrex, Inc., Research Triangle Park, NC (US)

( * ) Notice: Subject to any disclaimer, the term of this patent is extended or adjusted under 35 U.S.C. 154(b) by 149 days.

(21) Appl. No.: 10/074,714

(22) Filed: Feb. 13, 2002

(65) Prior Publication Data

US 2003/0150387 A1 Aug. 14, 2003

(51) Int. Cl.⁷ .............................................. A01K 45/00
(52) U.S. Cl. ........................................................ 119/6.8
(58) Field of Search ............................ 119/6.8, 6.5, 6.6, 119/50.7

(56) References Cited

U.S. PATENT DOCUMENTS

| | | |
|---|---|---|
| 2,477,752 A | 8/1949 | Kiss ................................. 119/1 |
| 2,762,365 A | 9/1956 | Wagner et al. ................... 128/1 |
| 2,851,006 A | 9/1958 | Taylor et al. ..................... 119/1 |
| 3,037,479 A | 6/1962 | Flory ................................ 119/1 |
| 3,077,993 A | 2/1963 | Mulvany et al. ................. 214/1 |
| 3,120,834 A | 2/1964 | Goldhaft et al. ................. 119/1 |
| 3,123,045 A | 3/1964 | Cosgrove et al. ................ 119/1 |
| 3,139,300 A | 6/1964 | Hirt .................................. 294/65 |
| 3,256,856 A | 6/1966 | Nicely et al. ..................... 119/1 |
| 3,377,989 A | 4/1968 | Sandhage et al. ................ 119/1 |
| 3,420,743 A | 1/1969 | Sandhage et al. ............ 195/104 |
| 3,506,140 A | 4/1970 | Koch et al. ....................... 214/1 |
| 3,594,285 A | 7/1971 | Noren ............................ 195/127 |
| 3,606,960 A | 9/1971 | Butterworth ................... 221/211 |
| 3,616,262 A | 10/1971 | Coady et al. .................. 195/127 |
| 3,740,173 A | 6/1973 | Natelson ....................... 417/475 |
| 3,910,233 A | 10/1975 | Amburn ........................... 119/1 |
| 3,991,174 A | 11/1976 | Grundman .................... 424/12 |
| 4,019,430 A | 4/1977 | Warren ........................... 99/485 |
| 4,040,388 A | 8/1977 | Miller ............................. 119/1 |
| 4,045,073 A | 8/1977 | Mosterd ......................... 294/87 |
| 4,058,363 A | 11/1977 | Silbert ............................ 21/58 |
| 4,233,001 A | 11/1980 | Schmid ....................... 417/475 |
| 4,355,936 A | 10/1982 | Thomas et al. .............. 414/118 |
| 4,392,285 A | 7/1983 | Stables et al. ................. 28/276 |
| 4,444,423 A | 4/1984 | Montferme et al. .......... 294/87 |
| 4,458,630 A | 7/1984 | Sharma et al. ................. 119/1 |
| 4,464,355 A | 8/1984 | Fabricius et al. ........... 424/101 |
| 4,469,047 A | 9/1984 | Miller ............................. 119/1 |
| 4,473,342 A | 9/1984 | Iles ............................. 417/360 |
| 4,522,570 A | 6/1985 | Schartz ....................... 417/475 |
| 4,571,336 A | 2/1986 | Houck et al. ................. 424/95 |
| 4,593,646 A | 6/1986 | Miller et al. ................... 119/1 |
| 4,604,038 A | 8/1986 | Belew ......................... 417/475 |
| 4,606,710 A | 8/1986 | Maguire ..................... 417/477 |
| 4,681,063 A | 7/1987 | Hebrank ........................ 119/1 |
| 4,822,605 A | 4/1989 | Powell ...................... 424/85.2 |
| 4,840,934 A | 6/1989 | Anderson ....................... 514/2 |
| 4,903,635 A | 2/1990 | Hebrank ........................ 119/1 |
| 4,928,628 A | 5/1990 | Gassman et al. .............. 119/1 |
| 4,928,629 A | 5/1990 | Trampel ........................ 119/1 |
| 4,950,245 A | 8/1990 | Brown et al. ............... 604/153 |
| 5,028,421 A | 7/1991 | Fredericksen et al. ..... 424/85.2 |
| 5,056,464 A | 10/1991 | Lewis .......................... 119/6.8 |

(List continued on next page.)

*Primary Examiner*—Yvonne Abbott
(74) *Attorney, Agent, or Firm*—Myers Bigel Sibley & Sajovec

(57) ABSTRACT

Methods and apparatus for delivering predetermined dosages of fluid to egg injection devices are provided and include drawing fluid from a fluid source into a syringe barrel via inlet tubing in fluid communication with the fluid source and with the syringe barrel, and dispensing a predetermined dosage of fluid from the syringe barrel to an egg injection device via outlet tubing in fluid communication with the egg injection device and with the syringe barrel. The outlet tubing is closed (e.g., pinched closed) during the drawing step, and the inlet tubing is closed (e.g., pinched closed) during the dispensing step.

35 Claims, 9 Drawing Sheets

U.S. PATENT DOCUMENTS

| | | | |
|---|---|---|---|
| 5,082,429 A | 1/1992 | Soderquist et al. | 417/477 |
| 5,096,393 A | 3/1992 | Van Steenderen et al. | 417/477 |
| 5,136,979 A | 8/1992 | Paul et al. | 119/6.8 |
| 5,158,038 A * | 10/1992 | Sheeks et al. | 119/6.8 |
| 5,176,101 A | 1/1993 | Paul et al. | 119/6.8 |
| 5,256,041 A | 10/1993 | Tucker | 417/477 |
| RE35,973 E | 12/1998 | Paul et al. | 119/6.8 |
| 5,941,696 A | 8/1999 | Fenstermacher et al. | 417/477.6 |
| 6,032,612 A | 3/2000 | Williams | 119/6.8 |
| 6,240,877 B1 * | 6/2001 | Bounds | 119/6.8 |
| 6,601,533 B1 * | 8/2003 | Bounds, Jr. | 119/6.8 |

* cited by examiner

METHODS AND APPARATUS FOR DELIVERING FLUID TO EGG INJECTION DEVICES

FIELD OF THE INVENTION

The present invention relates generally to eggs and, more particularly, to devices for injecting substances into eggs.

BACKGROUND OF THE INVENTION

Injections of various substances into avian eggs have been employed to decrease post-hatch mortality rates, increase the potential growth rates or eventual size of the resulting chicken, and even to influence the gender determination of the embryo. Similarly, injections of antigens into live eggs have been employed to incubate various substances used in vaccines which have human or animal medicinal or diagnostic applications. Examples of substances that have been used for, or proposed for, in ovo injection include vaccines, antibiotics and vitamins. In addition, removal of material from avian eggs has been employed for various purposes, such as testing and vaccine harvesting. Examples of in ovo treatment substances and methods of in ovo injection are described in U.S. Pat. No. 4,458,630 to Sharma et al. and U.S. Pat. No. 5,028,421 to Fredericksen et al., the contents of which are incorporated by reference herein in their entireties.

In ovo injections of substances typically occur by piercing the egg shell to create a hole through the egg shell (e.g., using a punch or drill), extending an injection needle through the hole and into the interior of the egg (and in some cases into the avian embryo contained therein), and injecting treatment substance(s) through the needle. An example of an injection device designed to inject through the large end of an avian egg is disclosed in U.S. Pat. No. 4,681,063 to Hebrank; this device positions an egg and an injection needle in a fixed relationship to each other, and is designed for the high-speed automated injection of a plurality of eggs. Alternatively, U.S. Pat. No. 4,458,630 to Sharma et al. describes a bottom (small end) injection machine.

Injection devices conventionally utilize solenoid-driven diaphragm pumps for selectably dispensing vaccine or other substances into eggs. Unfortunately, these pumps may be costly to maintain and replace, may be difficult to clean, and may not dispense vaccines or other substances with accuracy and/or consistency. Moreover, these pumps are conventionally designed to dispense a specific volume and may not allow for different (for example greater) volumes to be dispensed. In addition, vaccine dispensing manifolds are typically required which can be complex to produce and difficult to clean.

SUMMARY OF THE INVENTION

In view of the above discussion, methods and apparatus for delivering predetermined dosages of fluids (e.g., treatment substances) to egg injection heads of an in ovo injection apparatus are provided. According to embodiments of the present invention, a method of delivering a predetermined dosage of fluid to an egg injection device (e.g., an injection head) includes drawing fluid from a fluid source into a syringe barrel via inlet tubing in fluid communication with the fluid source and with the syringe barrel, and dispensing a predetermined dosage of fluid from the syringe barrel to the egg injection device via outlet tubing in fluid communication with the egg injection device and with the syringe barrel. The outlet tubing is closed (e.g., pinched closed) during the drawing step, and the inlet tubing is closed (e.g., pinched closed) during the dispensing step.

According to embodiments of the present invention, a method of delivering a predetermined dosage of fluid into an egg includes: drawing fluid from a fluid source into a syringe barrel via inlet tubing in fluid communication with the fluid source and with the syringe barrel; inserting an injection device into an egg, wherein outlet tubing is in fluid communication with the injection device and with the syringe barrel and wherein the outlet tubing is closed (e.g., pinched closed) so as to prevent the flow of fluid therethrough; closing the inlet tubing (e.g., pinching the inlet tubing closed); opening the outlet tubing; and dispensing a predetermined dosage of fluid from the syringe barrel through the outlet tubing and into the egg via the injection device. The outlet tubing is then closed (e.g., pinched closed), the inlet tubing is opened, and the injection device is withdrawn from the egg. The inlet and outlet tubing may be opened and flushed with a sanitizing fluid.

According to embodiments of the present invention, a device for delivering predetermined dosages of fluids (e.g., treatment substances) to an egg injection head of an in ovo injection apparatus includes a syringe, compressible inlet and outlet tubing for delivering fluid to an injection head, and a flow control apparatus. The syringe includes a barrel having proximal and distal ends and inlet and outlet ports in fluid communication with the barrel and with the compressible inlet and outlet tubing, respectively. The syringe also includes a plunger that is adapted for reciprocal movement within the barrel such that fluid is drawn into the barrel through the inlet port by a proximal motion of the plunger, and such that fluid is expelled from the barrel through the outlet port by a distal motion of the plunger. The flow control apparatus is configured to pinch the outlet tubing closed during proximal motion of the plunger and to pinch the inlet tubing closed during distal motion of the plunger.

According to embodiments of the present invention, the flow control apparatus includes a first valve configured to close the outlet tubing during proximal motion of the plunger, and a second valve configured to close the inlet tubing during distal motion of the plunger. The first and second valves may be pinch valves according to embodiments of the present invention.

According to embodiments of the present invention, the flow control apparatus includes a rocker arm pivotally operable relative to the inlet and outlet tubing. The rocker arm includes opposite first and second end portions. The rocker arm first end portion is configured to pinch the inlet tubing closed during distal motion of the plunger. The rocker arm second end portion is configured to pinch the outlet tubing closed during proximal motion of the plunger.

According to embodiments of the present invention, a device for delivering predetermined dosages of fluids (e.g., treatment substances) to an egg injection head of an in ovo injection apparatus includes a frame, a syringe positioned adjacent to the frame, an elongated member mounted to the frame for reciprocating movement along a longitudinal axis thereof, and compressible inlet and outlet tubing for delivering fluid to an injection head. The syringe includes a barrel having proximal and distal ends and inlet and outlet ports in fluid communication with the barrel and with the compressible inlet and outlet tubing, respectively. The syringe also includes a plunger that is adapted for reciprocal movement within the barrel such that fluid is drawn into the barrel through the inlet port by a proximal motion of the plunger, and such that fluid is expelled from the barrel through the outlet port by a distal motion of the plunger.

The elongated member includes opposite proximal and distal ends. First and second passageways extend through an intermediate portion of the elongated member along a first direction that is substantially transverse to the elongated member longitudinal axis. Third and fourth passageways extend through the elongated member along a second direction that is substantially transverse to the elongated member longitudinal axis and to the first direction. The first and third passageways are in communication with each other, and the second and fourth passageways are in communication with each other.

The compressible inlet tubing extends through the third passageway and is connected to a fluid source at one end and to the syringe inlet port at an opposite end. The compressible outlet tubing extends through the fourth passageway and is connected to the injection head at one end and to the syringe outlet port at an opposite end. A first squeeze bar extends through the first passageway and is fixed relative to the reciprocating elongated member. A second squeeze bar extends through the second passageway and is fixed relative to the reciprocating elongated member. The first and second squeeze bars may be secured to the frame and/or to another relatively fixed structure.

The first squeeze bar is configured to pinch the compressible inlet tubing when the elongated member is moved in the distal direction. Similarly, the second squeeze bar is configured to pinch the compressible outlet tubing when the elongated member is moved in the proximal direction.

An actuator system, is configured to move the elongated member in reciprocating motion along the longitudinal axis between at least three positions. In a first position, the elongated member is moved along the longitudinal axis thereof in a proximal direction such that the compressible outlet tubing within the fourth passageway is pinched closed by the second squeeze bar so as to prevent the flow of fluid therethrough. In a second position, the elongated member is moved along the longitudinal axis thereof in a distal direction such that the compressible inlet tubing within the third passageway is pinched closed by the first squeeze bar so as to prevent the flow of fluid therethrough. In a third position, the elongated member is moved along the longitudinal axis to a position between the first and second positions such that neither the compressible inlet tubing nor the compressible outlet tubing is pinched closed by the respective squeeze bars.

BRIEF DESCRIPTION OF THE DRAWINGS

The accompanying drawings, which form a part of the specification, illustrate embodiments of the present invention. The drawings and description together serve to fully explain the invention.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

An exemplary egg injection device, with which methods and apparatus for delivering a predetermined dosage of fluid according to embodiments of the present invention may be utilized, is the INOVOJECT® automated injection device (Embrex, Inc., Research Triangle Park, N.C.). However, embodiments of the present invention may be utilized with any in ovo injection device.

An egg injection device conventionally is designed to operate in conjunction with commercial egg carrier devices or flats. The injection device may comprise a plurality of injection needles which operate simultaneously or sequentially to inject a plurality of eggs, or a single injection needle used to inject a plurality of eggs. The injection device may comprise an "injection head" which comprises the injection needle or needles, and wherein each injection needle is in fluid communication with a source containing a treatment substance to be injected. A single fluid source may supply all of the injection needles in an injection device, or multiple fluid sources may be utilized.

As used herein, the term "treatment substance" refers to any substance that is injected into an egg to achieve a desired result. Treatment substances include, but are not limited to, vaccines, antibiotics, vitamins, virus, and immunomodulatory substances. Typically, the treatment substance is dispersed in a fluid medium, (e.g., is a fluid or emulsion) or is a solid dissolved in a fluid, or a particulate dispersed or suspended in a fluid.

Figure 1:
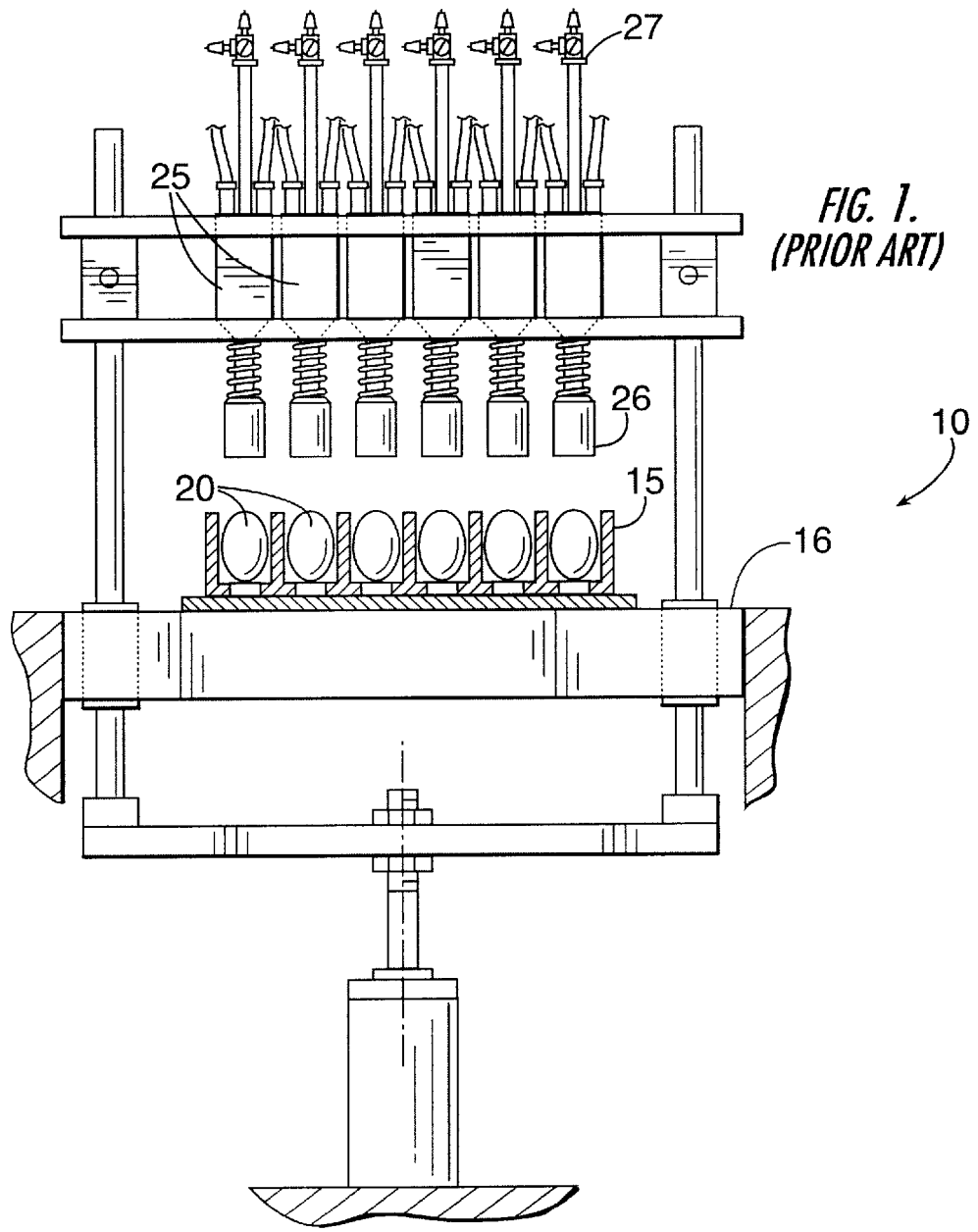
FIG. 1 is a side view of a multiple injection head in ovo injection device with which fluid delivery devices and methods according to embodiments of the present invention may be used.

An exemplary in ovo injection apparatus 10 is illustrated in FIG. 1. The illustrated apparatus 10 includes a flat 15 for carrying eggs 20, a stationary base 16, and a plurality of conventional injection delivery devices, or heads, 25 with fluid delivery means such as lumens or needle(s) positioned therein in accordance with known techniques. The flat 15 holds a plurality of eggs 20 in a substantially upright position. The flat 15 is configured to provide external access to predetermined areas of the eggs 20. Each egg 20 is held by the flat 15 so that a respective end thereof is in proper alignment relative to a corresponding one of the injection heads 25 as the injection head 25 advances towards the base 16 of the apparatus. However, in ovo injection devices may inject eggs in various orientations. Embodiments of the present invention are not limited only to in ovo injection devices that inject eggs in the illustrated orientation.

As used herein, a "lumen" is a cavity or inner open space of a tube such as a needle. A lumen for delivery of a treatment substance may be within a needle, or between a needle and an outer guide or punch. Multiple lumens may be formed within a single needle, and the outlet ports may be positioned at different locations on a needle.

Each of the plurality of injection heads 25 has opposing first and second ends 26, 27. The heads 25 have a first extended position and a second retracted position, as is known in the art. Upon extension of an injection head 25, the first end 26 is configured to contact and rest against predetermined areas of an external egg shell. When not injecting, the injection heads 25 are retracted to rest a predetermined distance above the eggs 20 and stationary base 16. Alternatively, the base 16 can be longitudinally slidably moveable to position the eggs 20 in proper position relative to the injection heads 25.

Figure 2:
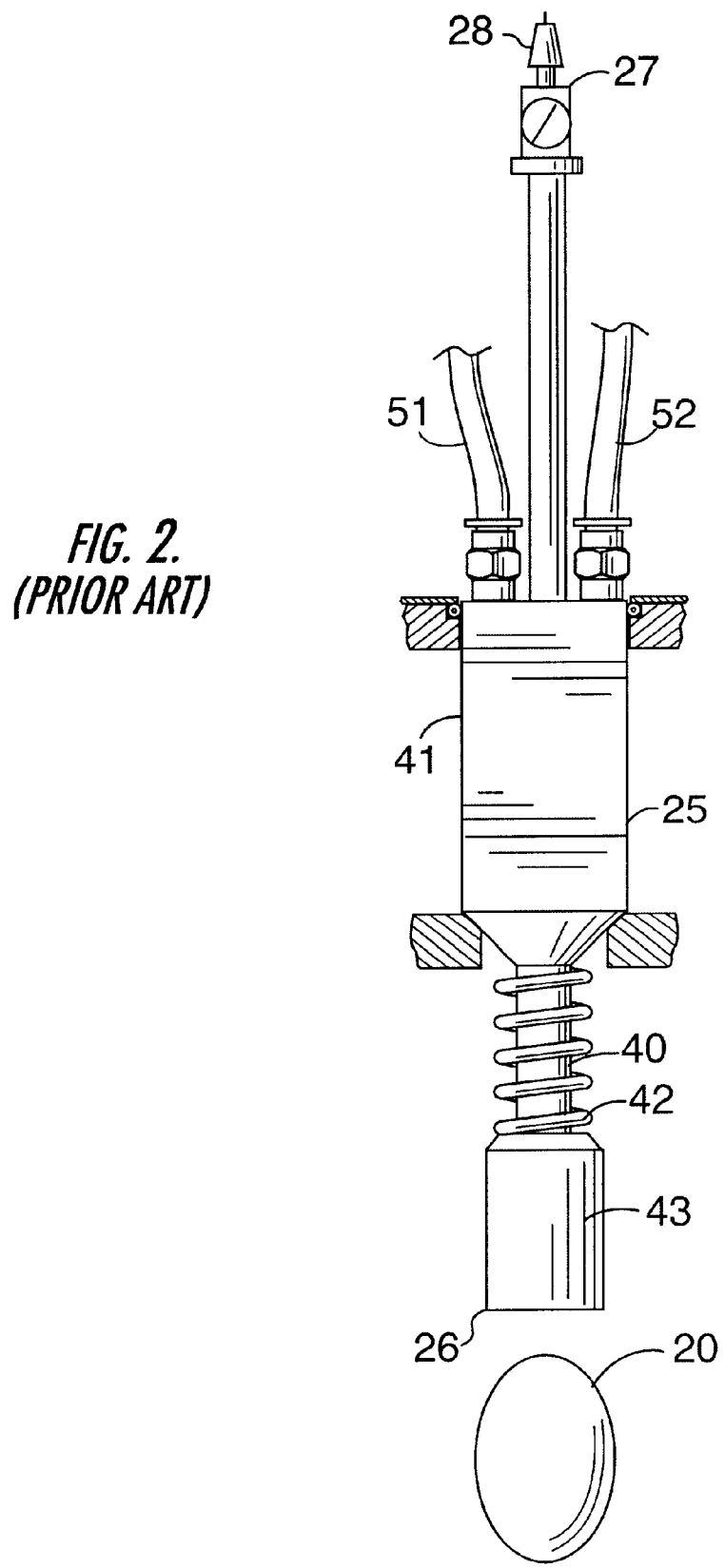
FIG. 2 is a side view of an injection head of the injection device of FIG. 1.

As shown in FIG. 2, an exemplary in ovo injection head 25 includes a body member 40 having opposing top 41 and bottom 43 end portions with an elongate longitudinal aperture formed therein, and a delivery device, such as a needle (not shown) positioned in the aperture. The injection head 25 includes an egg locating member, or egg engaging member, on end portion 26, which is slidably connected to the body member 40 and includes a spring 42 to both cushion the engagement with an egg 20, and hold the egg 20 in place during the down stroke of the injection head 25. A punch is conventionally provided to pierce the egg shell, and the needle then extends beyond the punch and into a desired compartment of the egg, all in accordance with known techniques. Pneumatic lines 51, 52, are provided for advancing or withdrawing an injection needle into an egg as would be understood by those skilled in the art. The second end 27 of the injection delivery head 25 includes an inlet port 28 which is configured to receive tubing that delivers treatment substances and/or sanitizing fluid (such as a chlorine solution).

Figure 3:
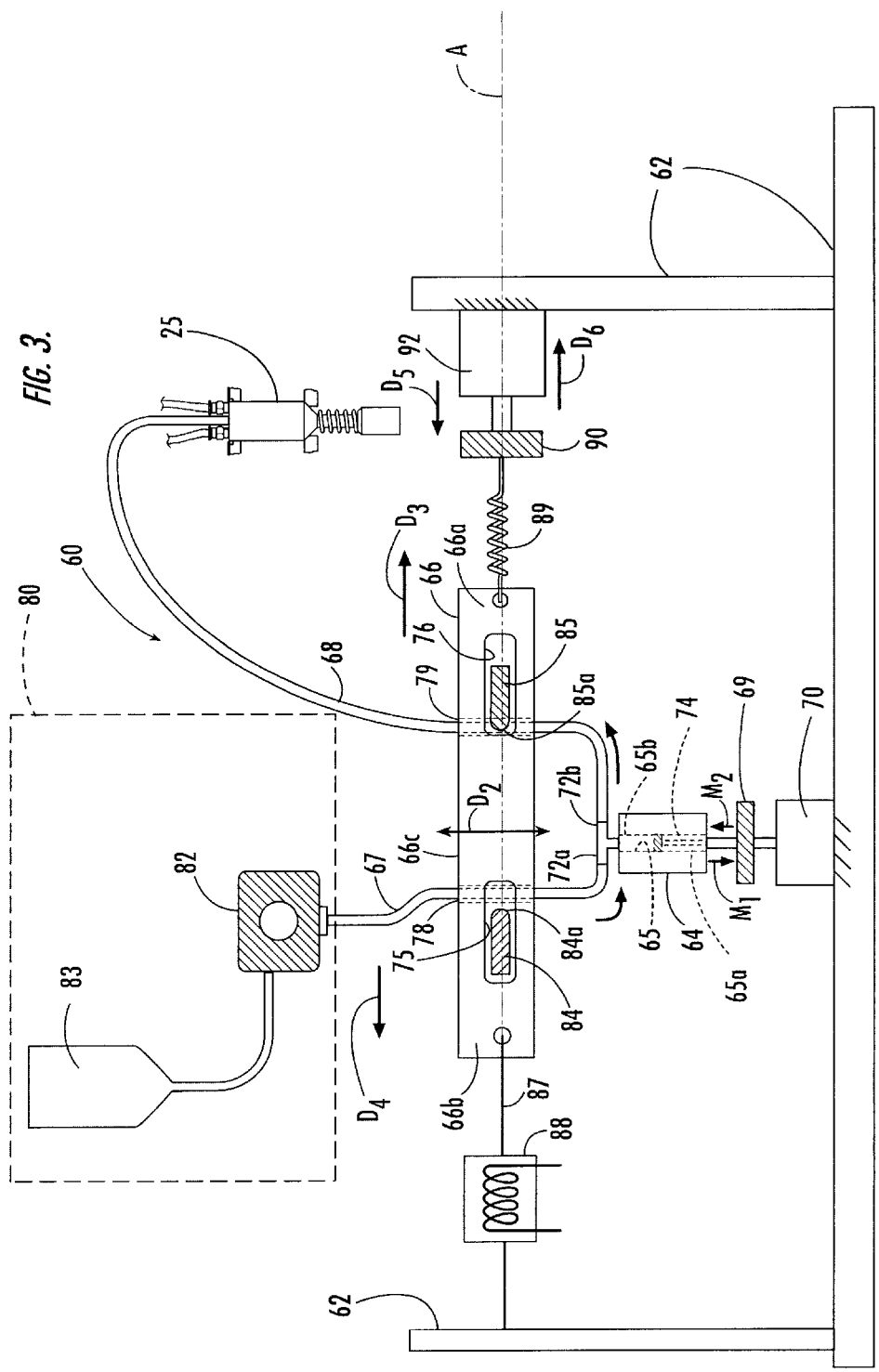
FIG. 3 is a schematic illustration of a device for delivering predetermined dosages of fluids to an egg injection head of an in ovo injection apparatus, according to embodiments of the present invention.
Figure 4:
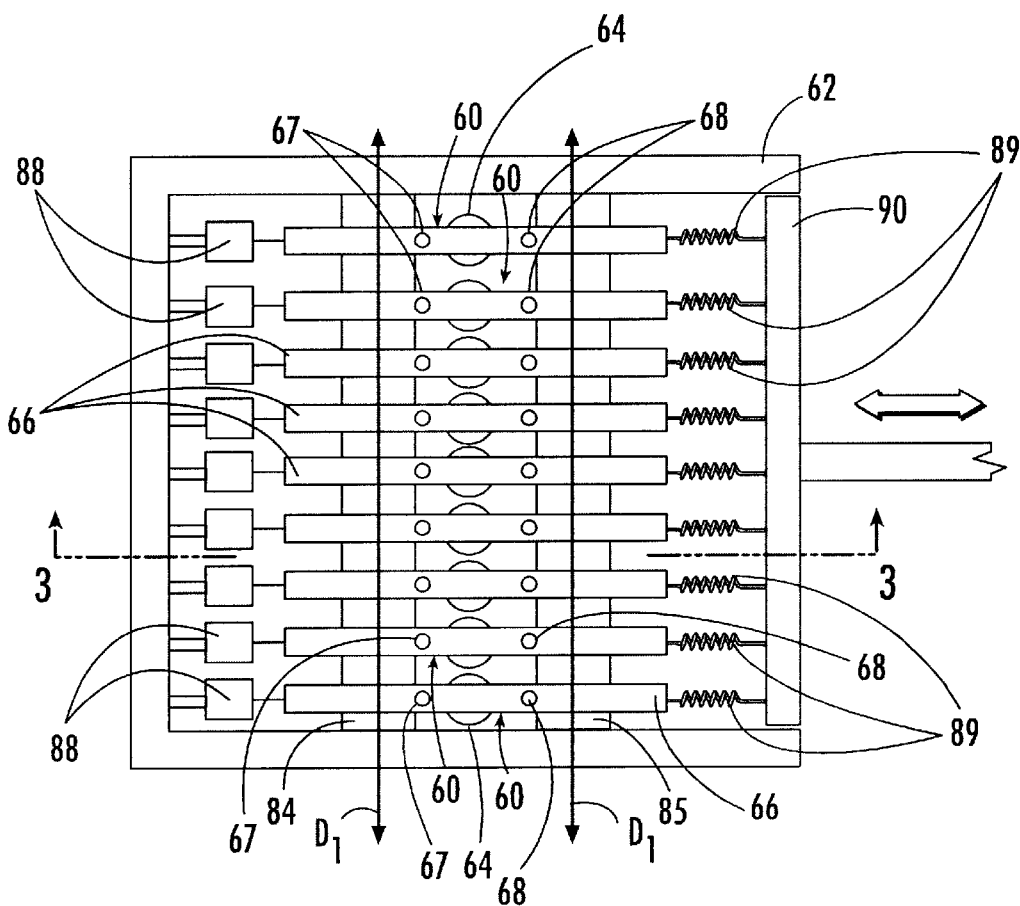
FIG. 4 is a top plan view of a plurality of the devices of FIG. 3 arranged in adjacent, spaced-apart relationship for use with a multiple injection head in ovo injection device.

Referring now to FIG. 3, a device 60 for delivering predetermined dosages of fluids (e.g., treatment substances) to an egg injection head of an in ovo injection apparatus, according to embodiments of the present invention, is illustrated. FIG. 3 is a side view of a single delivery device 60 taken along lines 3—3 of FIG. 4. As illustrated in FIG. 4, a respective delivery device 60 is provided for each injection head 25 of an in ovo injection device.

The illustrated fluid delivery device 60 includes a frame 62, a syringe 64 positioned adjacent to the frame 62, an elongated member 66 mounted to the frame 62 for reciprocating movement along a longitudinal axis A thereof, and compressible inlet and outlet tubing 67, 68 for delivering fluid to an injection head 25.

The illustrated syringe 64 includes a barrel 65 having proximal and distal ends 65a, 65b. Inlet and outlet ports 72a, 72b are in fluid communication with the barrel 65 and with the compressible inlet and outlet tubing 67, 68, respectively. The syringe 64 also includes a plunger 74 that is adapted for reciprocal movement within the barrel 65 such that fluid is drawn into the barrel 65 through the inlet port 72a by a proximal motion (indicated by $M_1$) of the plunger 74, and such that fluid is expelled from the barrel 65 through the outlet port 72b by a distal motion (indicated by $M_2$) of the plunger 74. The plunger 74 of syringe 64 need not scrape the internal wall of the barrel 65 to effectively draw fluid within or expel fluid from the barrel 65.

In the illustrated embodiment, the plungers 74 of the syringes 64 of each fluid delivery device 60 are commonly actuated by syringe bar 69 and actuator 70. Syringe bar actuator 70 is configured to cause both proximal and distal motion $M_1$, $M_2$ of each syringe plunger 74. Syringe bar actuator 70 may have various configurations and may be electrically-operable, pneumatically-operable, hydraulically-operable, etc. The syringe bar 69 is configured to facilitate precise adjustments in collective dispensing volumes.

The illustrated elongated member 66 includes opposite proximal and distal ends 66a, 66b. First and second passageways 75, 76 extend through an intermediate portion 66c of the elongated member 66 along a first direction $D_1$ that is substantially transverse to the elongated member longitudinal axis A. Third and fourth passageways 78, 79 extend through the elongated member 66 along a second direction $D_2$ that is substantially transverse to the elongated member longitudinal axis A and to the first direction $D_1$. The first and third passageways 75, 78 are in communication with each other, and the second and fourth 76, 79 passageways are in communication with each other, as illustrated (i.e., the first and third passageways 75, 78 are internally connected, and the second and fourth passageways 76, 79 are internally connected within the elongated member 66).

The compressible inlet tubing 67 extends through the third passageway 78 and is connected to a fluid source (indicated generally as 80) at one end and to the syringe inlet port 72a at an opposite end. The illustrated fluid source 80 includes a manifold 82 for distributing fluid among the plurality of injection heads 25 of an in ovo injection device and a fluid bag 83 for supplying fluid to the manifold 82. The fluid source may provide any type of fluid as described above (e.g., treatment substances, etc.). The compressible outlet tubing 68 extends through the fourth passageway 79 of the elongated member 66, and is connected to a respective injection head 25 at one end and to the syringe outlet port 72b at an opposite end, as illustrated. An exemplary tubing material for use as the inlet and outlet tubing 67, 68 for the various embodiments of the present invention includes, but is not limited to, saniprene tubing.

A first squeeze bar 84 extends through the first passageway 75 and is fixed relative to the reciprocating elongated member 66. A second squeeze bar 85 extends through the second passageway 76 and is fixed relative to the reciprocating elongated member 66. The first and second squeeze bars 84, 85 may be secured to the frame 62 and/or to another relatively fixed structure.

Figure 5A:
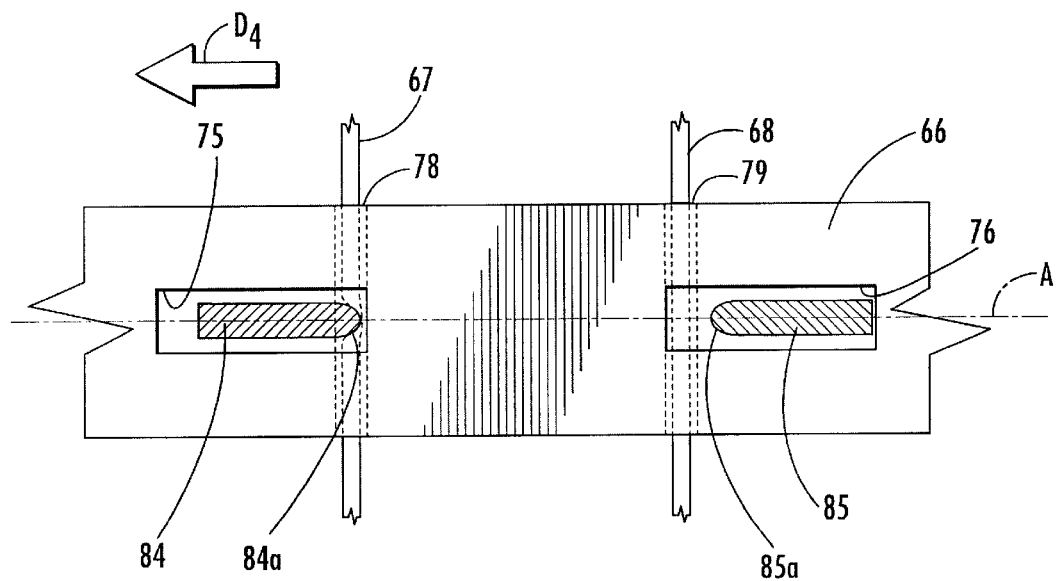
FIGS. 5A–5C are enlarged, partial side views of an elongated member of the device of FIG. 3 in three respective positions, according to embodiments of the present invention.

The first squeeze bar 84 has an arcuate edge portion 84a, as illustrated in greater detail in FIG. 5A, that is configured to pinch the compressible inlet tubing 67 when the elongated member 66 is moved in the distal direction (indicated by $D_4$). Similarly, the second squeeze bar 85 has an arcuate edge portion 85a, as illustrated in greater detail in FIG. 5B, that is configured to pinch the compressible outlet tubing 68 when the elongated member 66 is moved in the proximal direction (indicated by $D_3$). Edge portions 84a, 85a may have various shapes and configurations and are not limited to the illustrated configuration.

Referring back to FIG. 3, an actuator system, comprising a solenoid-activated actuator arm 87 attached to the elongated member distal end 66b and a spring 89 attached to the elongated member proximal end 66a, is configured to move the elongated member 66 in reciprocating motion along the longitudinal axis A. The spring 89 is configured to urge the elongated member 66 along the longitudinal axis A in a proximal direction (indicated by $D_3$) such that the compressible outlet tubing 68 within the fourth passageway 79 is pinched closed by the second squeeze bar 85. The actuator arm 87 is configured to move the elongated member 66 along the longitudinal axis A in a distal direction (indicated by $D_4$) against the force imparted by the spring 89 such that the compressible inlet tubing 67 is pinched closed within the third passageway 78 by the first squeeze bar 84.

In the illustrated embodiment, the actuator arm 87 is controlled via an electrically-operable solenoid 88. However, the actuator arm 87 may be controlled in various ways (e.g., pneumatic actuators, etc.) and is not limited to control via the illustrated electrically-operable solenoid 88. The spring 89 may be of any type and may have various configurations and is not limited to a particular type or configuration of spring. In the illustrated embodiment, each spring 89 is attached to a common spring bar 90. Common spring bar 90 is operably connected to an actuator 92 which is configured to remove the preload of spring 90 via movement in the direction $D_5$ (e.g., to perform maintenance on a delivery device 60). Movement of a spring 89, via actuator 92, in the direction $D_6$ sets the preload of the spring 89.

Figure 5B:
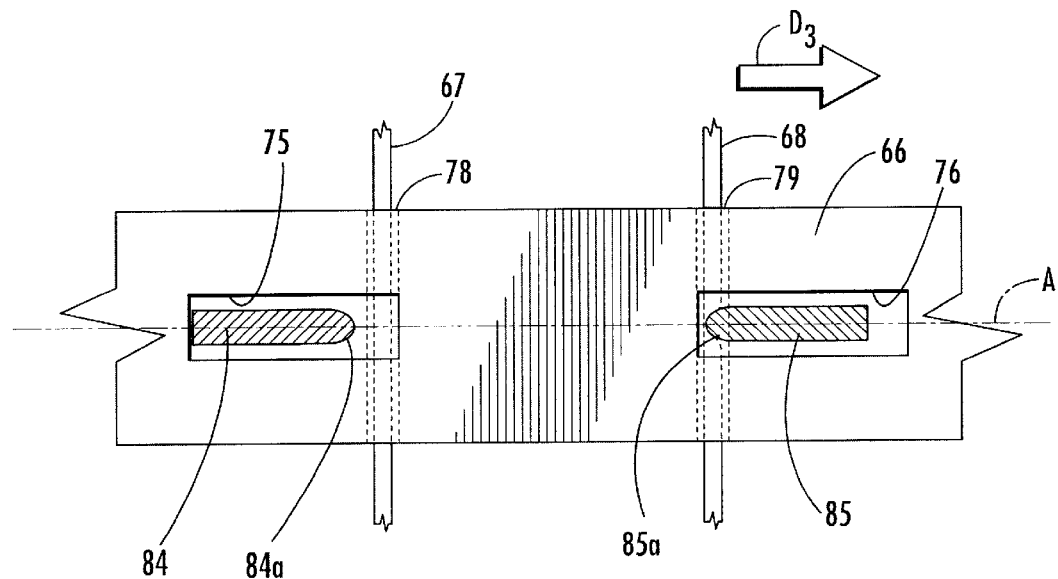
Figure 5C:
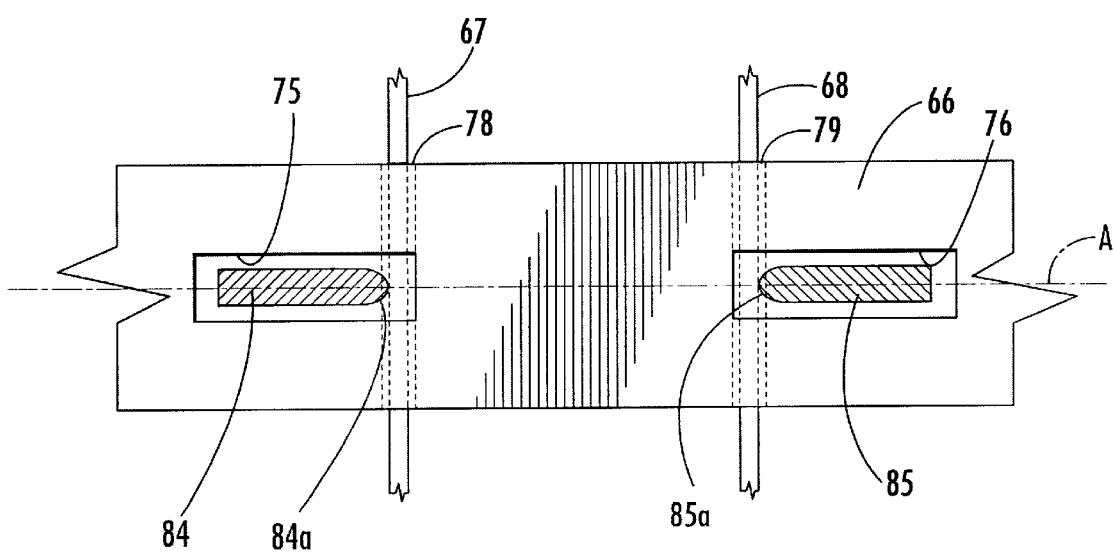

As illustrated in FIGS. 5A–5C, the actuator system is configured to move the elongated member 66 between at least three positions. In a first position (FIG. 5B), the elongated member 66 is moved along the longitudinal axis A thereof in a proximal direction (indicated by $D_3$) such that the compressible outlet tubing 68 within the fourth passageway 79 is pinched by the second squeeze bar 85 so as to prevent the flow of fluid therethrough. In the first position, the compressible inlet tubing 67 is open and fluid can be drawn into the syringe barrel 65 via the plunger 74. Also, if it is decided not to inject fluid into a particular egg, the elongated member 66 can remain in the first position and when the syringe plunger 74 is depressed via common syringe bar actuator 70, the fluid can flow back through the inlet tubing 67.

In a second position (FIG. 5A), the elongated member 66 is moved along the longitudinal axis A thereof in a distal direction (indicated by $D_4$) such that the compressible inlet tubing 67 within the third passageway 78 is pinched by the first squeeze bar 84 so as to prevent the flow of fluid therethrough. In the second position, the compressible inlet tubing 67 is closed and fluid can be expelled from the syringe barrel to the injection head 25 via the outlet tubing 68 when the plunger 74 is depressed.

In a third position (FIG. 5C), the elongated member 66 is moved along the longitudinal axis A to a position between the first and second positions such that neither the compressible inlet tubing 67 nor the compressible outlet tubing 68 is pinched by the respective squeeze bars 84, 85. In the third position, the inlet and outlet tubing 67, 68 are open and can be flushed with sanitizing fluid, removed from service, and/or replaced.

Figure 6:
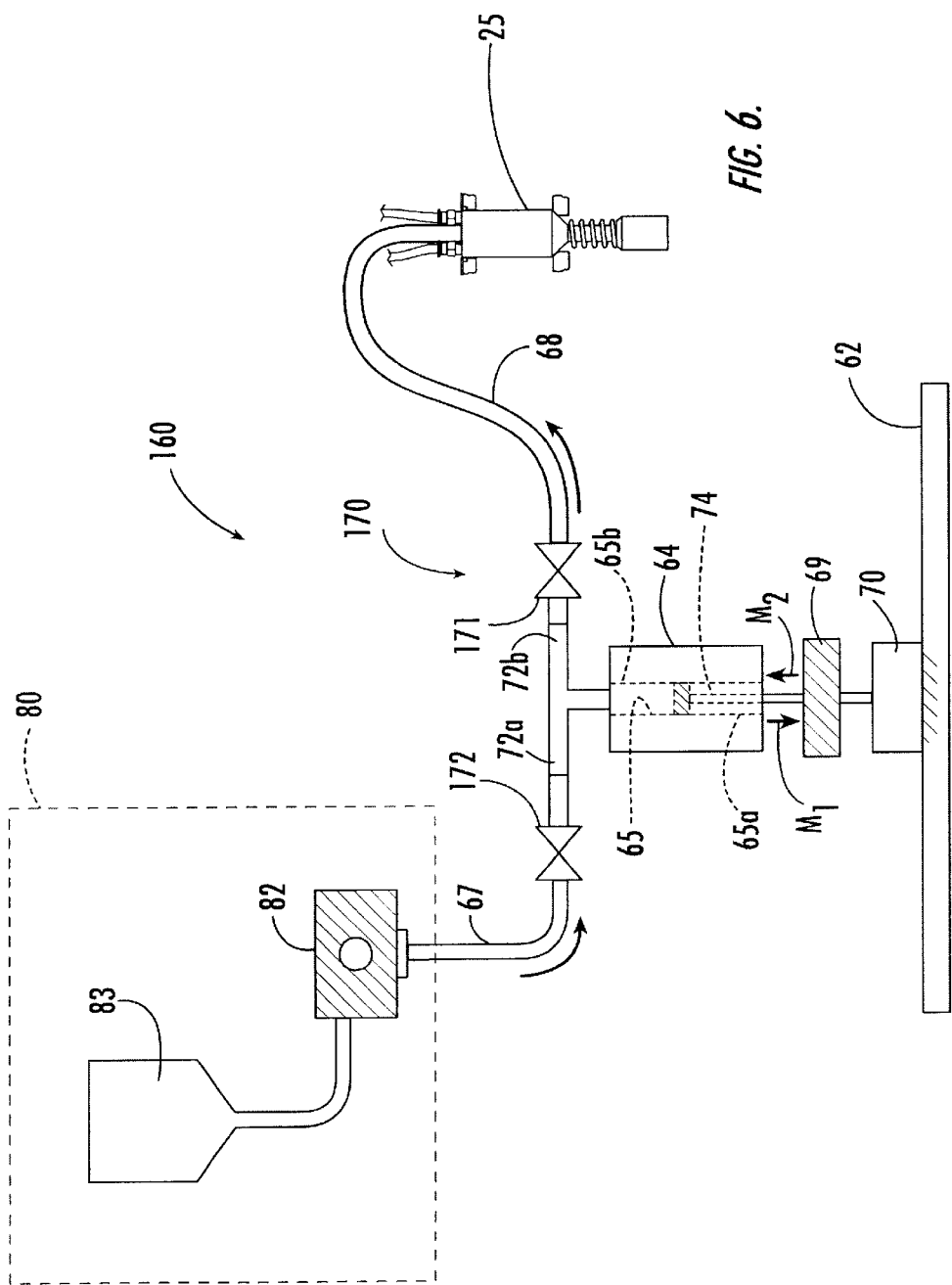
FIG. 6 is a schematic illustration of a device for delivering predetermined dosages of fluids to an egg injection head of an in ovo injection apparatus, according to additional embodiments of the present invention.

Referring now to FIG. 6, a device 160 for delivering predetermined dosages of fluids (e.g., treatment substances) to an egg injection head of an in ovo injection apparatus, according to embodiments of the present invention, is illustrated. A respective delivery device 160 could be provided for each injection head 25 of an in ovo injection device as described above with respect to the embodiments of FIG. 3.

The illustrated fluid delivery device 160 includes a syringe 64, compressible inlet and outlet tubing 67, 68 for delivering fluid to an injection head 25, and a flow control apparatus 170 that is configured to selectively close the inlet and outlet tubing 67, 68 as described below. As described above with respect to FIG. 3, the syringe 64 includes a barrel 65 having proximal and distal ends 65a, 65b. Inlet and outlet ports 72a, 72b are in fluid communication with the barrel 65 and with the compressible inlet and outlet tubing 67, 68, respectively. The syringe 64 also includes a plunger 74 that is adapted for reciprocal movement within the barrel 65 such that fluid is drawn into the barrel 65 through the inlet port 72a by a proximal motion (indicated by $M_1$) of the plunger 74, and such that fluid is expelled from the barrel 65 through the outlet port 72b by a distal motion (indicated by $M_2$) of the plunger 74.

The plunger 74 is commonly actuated by syringe bar 69 and actuator 70. Syringe bar actuator 70 is configured to cause both proximal and distal motion $M_1, M_2$ of a plurality of syringe plungers 74 as described above with respect to FIG. 3. Syringe bar actuator 70 may have various configurations and may be electrically-operable, pneumatically-operable, hydraulically-operable, etc. The syringe bar 69 is configured to facilitate precise adjustments in collective dispensing volumes.

The compressible inlet tubing 67 is connected to a fluid source (indicated generally as 80) at one end and to the syringe inlet port 72a at an opposite end. The illustrated fluid source 80 includes a manifold 82 for distributing fluid among a plurality of injection heads 25 of an in ovo injection device and a fluid bag 83 for supplying fluid to the manifold 82. The fluid source may provide any type of fluid as described above (e.g., treatment substances, etc.). The compressible outlet tubing 68 is connected to a respective injection head 25 at one end and to the syringe outlet port 72b at an opposite end, as illustrated.

The flow control apparatus 170 includes a first valve 171 configured to close the outlet tubing 68 during proximal motion $M_1$ of the plunger 74, and a second valve 172 configured to close the inlet tubing 67 during distal motion $M_2$ of the plunger 74. Various types of valves may be utilized. According to embodiments of the present invention, pinch valves may be utilized. For example, the first valve 171 may be a pinch valve which is configured to pinch closed the outlet tubing 68 during proximal motion $M_1$ of the plunger 74, and the second valve 172 may be a pinch valve that is configured to pinch closed the inlet tubing 67 during distal motion $M_2$ of the plunger 74. Pinch valves are well known to those skilled in the art. Exemplary pinch valves that may be used in accordance with embodiments of the present invention are available from Bio-Chem Valve, Inc., 85 Fulton Street, Boonton, N.J.

Figure 7:
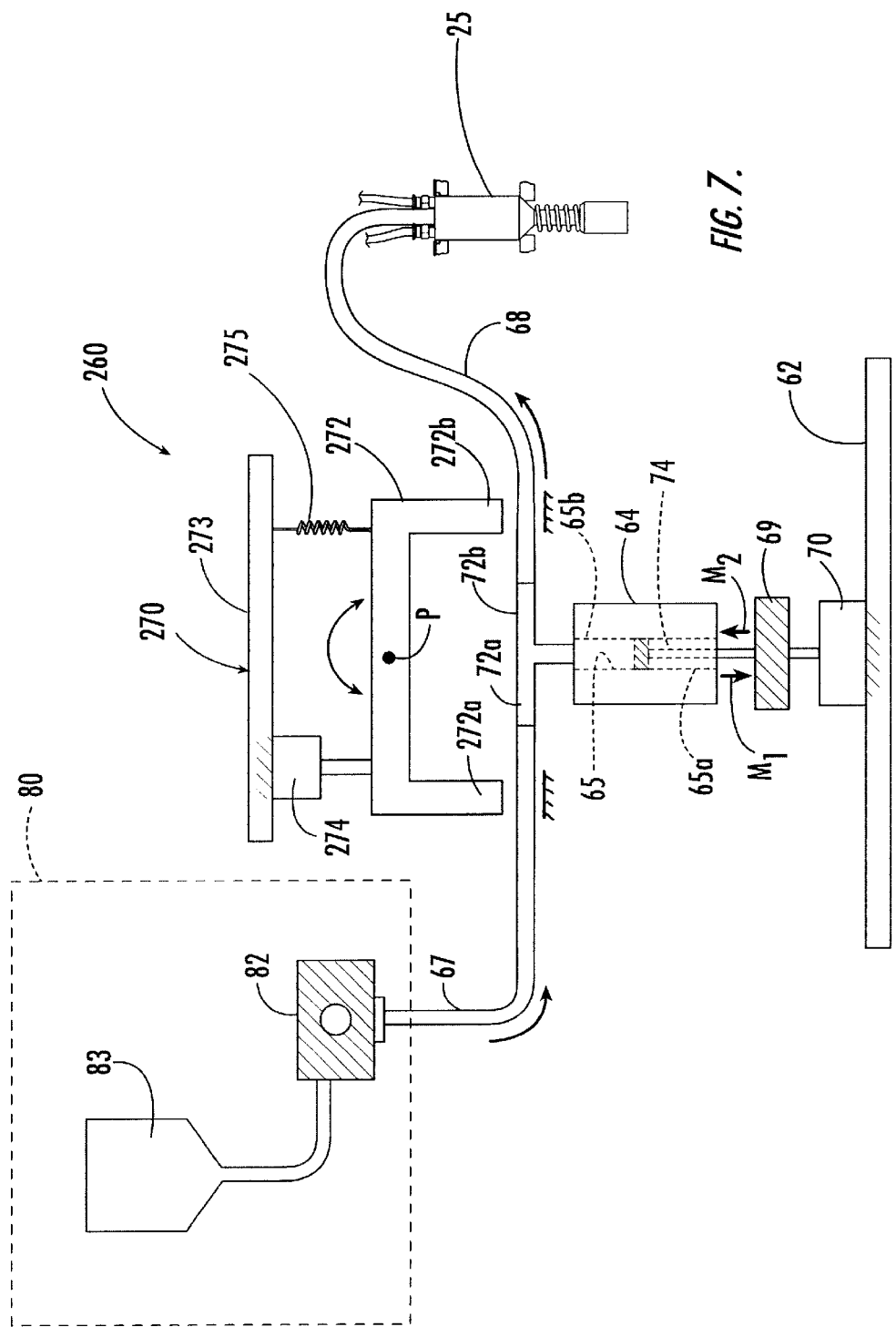
FIG. 7 is a schematic illustration of a device for delivering predetermined dosages of fluids to an egg injection head of an in ovo injection apparatus, according to additional embodiments of the present invention.

Referring now to FIG. 7, a device 260 for delivering predetermined dosages of fluids (e.g., treatment substances) to an egg injection head of an in ovo injection apparatus, according to embodiments of the present invention, is illustrated. A respective delivery device 260 could be provided for each injection head 25 of an in ovo injection device as described above with respect to the embodiments of FIG. 3.

The illustrated fluid delivery device 260 includes a syringe 64, compressible inlet and outlet tubing 67, 68 for delivering fluid to an injection head 25, and a flow control apparatus 270 that is configured to selectively close the inlet and outlet tubing 67, 68 as described below. As described above with respect to FIG. 3, the syringe 64 includes a barrel 65 having proximal and distal ends 65a, 65b. Inlet and outlet ports 72a, 72b are in fluid communication with the barrel 65 and with the compressible inlet and outlet tubing 67, 68, respectively. The syringe 64 also includes a plunger 74 that is adapted for reciprocal movement within the barrel 65 such that fluid is drawn into the barrel 65 through the inlet port 72a by a proximal motion (indicated by $M_1$) of the plunger 74, and such that fluid is expelled from the barrel 65 through the outlet port 72b by a distal motion (indicated by $M_2$) of the plunger 74.

The plunger 74 is commonly actuated by syringe bar 69 and actuator 70. Syringe bar actuator 70 is configured to cause both proximal and distal motion $M_1$, $M_2$ of a plurality of syringe plungers 74 as described above with respect to FIG. 3. Syringe bar actuator 70 may have various configurations and may be electrically-operable, pneumatically-operable, hydraulically-operable, etc. The syringe bar 69 is configured to facilitate precise adjustments in collective dispensing volumes.

The compressible inlet tubing 67 is connected to a fluid source (indicated generally as 80) at one end and to the syringe inlet port 72a at an opposite end. The illustrated fluid source 80 includes a manifold 82 for distributing fluid among a plurality of injection heads 25 of an in ovo injection device and a fluid bag 83 for supplying fluid to the manifold 82. The fluid source may provide any type of fluid as described above (e.g., treatment substances, etc.). The compressible outlet tubing 68 is connected to a respective injection head 25 at one end and to the syringe outlet port 72b at an opposite end, as illustrated.

The flow control apparatus 270 includes a rocker arm 272 that is pivotally operable relative to the inlet and outlet tubing 67, 68. The illustrated rocker arm 272 pivots about point P and has opposite first and second end portions 272a, 272b. An actuator 274 mounted to a support frame 273 is configured to move the rocker arm 272 about pivot point P so as to selectively close the inlet and outlet tubing 67, 68. The actuator 274 is configured to move the rocker arm first end portion 272a downwardly towards the inlet tubing 67 and to pinch the inlet tubing 67 closed. The actuator 274 is also configured to move the rocker arm first end portion 272a upwardly away from the inlet tubing 67 such that the rocker arm second end portion 272b moves downwardly towards the outlet tubing 68 and pinches the outlet tubing 68 closed. A spring 275 is also mounted to the support frame 273 and is provided to help return the rocker arm 272 to a non-engaged position as would be understood by those skilled in the art.

According to embodiments of the present invention, the actuator 274 causes the rocker arm second end portion 272b to pinch the outlet tubing 68 closed during proximal motion $M_1$ of the plunger 74. The actuator 274 causes the rocker arm first end portion 272a to pinch the inlet tubing closed during distal motion $M_2$ of the plunger 74. Embodiments of the present invention are not limited to the illustrated rocker arm configuration. The rocker arm 272 may have various configurations, shapes and sizes, without limitation.

Figure 8:
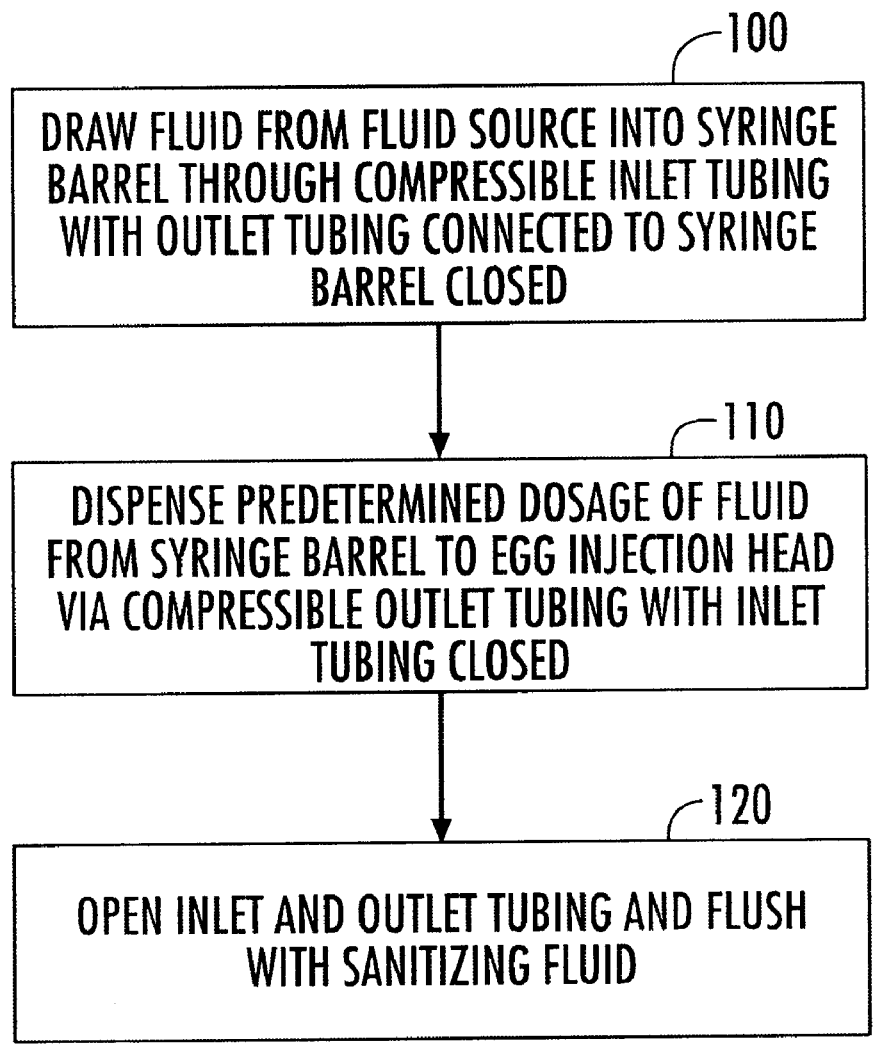
FIG. 8 is a flow chart of operations for delivering predetermined dosages of fluid to egg injection heads via a delivery device according to embodiments of the present invention.

Referring now to FIG. 8, operations for delivering predetermined dosages of fluid to egg injection heads via a delivery device according to embodiments of the present invention are illustrated. Fluid, such as a treatment substance (e.g., vaccine, etc.) is drawn from a fluid source into a syringe barrel through compressible inlet tubing in fluid communication with the fluid source and with the syringe barrel (Block 100). The compressible outlet tubing is closed while fluid is drawn into the syringe barrel. With respect to the illustrated delivery device 60 of FIG. 3, this is accomplished by moving the elongated member 66 in a proximal direction (i.e., the elongated member 66 is moved to the first position) such that the second squeeze bar 85 pinches closed the compressible outlet tubing 68.

A predetermined dosage of fluid from the syringe barrel is then dispensed to an egg injection device via compressible outlet tubing in fluid communication with the egg injection device and with the syringe barrel (Block 110). The compressible inlet tubing is closed while fluid is drawn into the syringe barrel. With respect to the illustrated delivery device 60 of FIG. 3, this is accomplished by moving the elongated member 66 in a distal direction (i.e., the elongated member 66 is moved to the second position) such that the first squeeze bar 85 pinches closed the compressible inlet tubing 67.

The inlet and/or outlet tubing may then be flushed (along with the injection device and/or other components of the delivery device 60 of FIG. 3) with a sanitizing fluid (Block 120). Typically flushing is performed at the beginning and end of the injection day. However, flushing may be performed according to any desired schedule. With respect to the illustrated delivery device 60 of FIG. 3, this is accomplished by moving the elongated member 66 to a third position between the first and second positions such that neither the inlet nor outlet tubing 67, 68 is pinched closed by the respective squeeze bars 84, 85.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A device for delivering a predetermined dosage of fluid to an egg injection device, comprising:
   a syringe, comprising:
      a barrel having proximal and distal ends;
      inlet and outlet ports in fluid communication with the barrel; and
      a plunger adapted for reciprocal movement within the barrel such that fluid is drawn into the barrel through the inlet port by a proximal motion of the plunger, and such that fluid is expelled from the barrel through the outlet port by a distal motion of the plunger;
   inlet tubing connected to a fluid source at one end and to the syringe inlet port at an opposite end;
   outlet tubing connected to an egg injection device at one end and to the syringe outlet port at an opposite end; and
   a flow control apparatus configured to close the outlet tubing closed during proximal motion of the plunger and to close the inlet tubing closed during distal motion of the plunger.

2. The device of claim 1, wherein the flow control apparatus comprises:
   a first valve configured to close the outlet tubing during proximal motion of the plunger; and
   a second valve configured to close the inlet tubing during distal motion of the plunger.

3. The device of claim 2, wherein the inlet and outlet tubing are compressible, and wherein the first and second valves are pinch valves.

4. The device of claim 1, wherein the inlet and outlet tubing are compressible, wherein the flow control apparatus comprises a rocker arm pivotally operable relative to the inlet and outlet tubing, wherein the rocker arm comprises opposite first and second end portions, wherein the first end portion is configured to pinch the outlet tubing closed during proximal motion of the plunger, and wherein the second end portion is configured to pinch the inlet tubing closed during distal motion of the plunger.

5. An automated in ovo injection apparatus, comprising:
a plurality of injection devices configured to inject fluid into a respective plurality of eggs;
a fluid source for holding fluid to be injected into the eggs; and
a fluid delivery system for delivering a predetermined dosage of fluid from the fluid source to each injection device, comprising:
a plurality of syringes, each comprising:
a barrel having proximal and distal ends;
inlet and outlet ports in fluid communication with the barrel; and
a plunger adapted for reciprocal movement within the barrel such that fluid is drawn into the barrel through the inlet port by a proximal motion of the plunger, and such that fluid is expelled from the barrel through the outlet port by a distal motion of the plunger;
inlet tubing connected to the fluid source at one end and to a respective syringe inlet port at an opposite end;
outlet tubing connected to a respective injection device at one end and to a respective syringe outlet port at an opposite end;
a plurality of flow control devices, each operably associated with a respective syringe, wherein each flow control device is configured to close the outlet tubing during proximal motion of a respective syringe plunger and to close the inlet tubing during distal motion of the respective syringe plunger.

6. The in ovo injection apparatus of claim 5, each flow control apparatus comprises:
a first valve configured to close the outlet tubing during proximal motion of the plunger; and
a second valve configured to close the inlet tubing during distal motion of the plunger.

7. The in ovo injection apparatus of claim 6, wherein the inlet and outlet tubing are compressible, and wherein the first and second valves are pinch valves.

8. The in ovo injection apparatus of claim 5, wherein the inlet and outlet tubing are compressible, wherein each flow control apparatus comprises a rocker arm pivotally operable relative to the inlet and outlet tubing, wherein the rocker arm comprises opposite first and second end portions, wherein the first end portion is configured to pinch the outlet tubing closed during proximal motion of the plunger, and wherein the second end portion is configured to pinch the inlet tubing closed during distal motion of the plunger.

9. A device for delivering a predetermined dosage of fluid to an egg injection device, comprising:
a frame;
a syringe positioned adjacent the frame, comprising:
a barrel having proximal and distal ends;
inlet and outlet ports in fluid communication with the barrel; and
a plunger adapted for reciprocal movement within the barrel such that fluid is drawn into the barrel through the inlet port by a proximal motion of the plunger, and such that fluid is expelled from the barrel through the outlet port by a distal motion of the plunger;
an elongated member mounted to the frame for reciprocating movement along a longitudinal axis thereof, comprising:
opposite proximal and distal ends;
first and second passageways extending through the elongated member along a first direction that is substantially transverse to the elongated member longitudinal axis; and
third and fourth passageways extending through the elongated member along a second direction that is substantially transverse to the elongated member longitudinal axis and to the first direction, wherein the first and third passageways are in communication, and wherein the second and fourth passageways are in communication;
compressible inlet tubing extending through the third passageway, wherein the compressible inlet tubing is connected to a fluid source at one end and to the syringe inlet port at an opposite end;
compressible outlet tubing extending through the fourth passageway, wherein the compressible outlet tubing is connected to an egg injection device at one end and to the syringe outlet port at an opposite end;
a first squeeze bar extending through the first passageway, wherein the first squeeze bar is fixed relative to the elongated member;
a second squeeze bar extending through the second passageway, wherein the second squeeze bar is fixed relative to the elongated member; and
an actuator system attached to the elongated member that is configured to move the elongated member along the longitudinal axis thereof between a first position wherein the compressible outlet tubing is pinched within the fourth passageway by the second squeeze bar so as to prevent the flow of fluid therethrough, and a second position wherein the compressible inlet tubing is pinched within the third passageway by the first squeeze bar so as to prevent the flow of fluid therethrough.

10. The device of claim 9, wherein the actuator system comprises:
a spring attached to the elongated member that urges the elongated member along the longitudinal axis thereof in a proximal direction such that the compressible outlet tubing within the fourth passageway is pinched by the second squeeze bar so as to prevent the flow of fluid therethrough; and
an actuator arm attached to the elongated member that is configured to move the elongated member along the longitudinal axis thereof in a distal direction against a force imparted by the spring such that the compressible inlet tubing is pinched within the third passageway by the first squeeze bar so as to prevent the flow of fluid therethrough.

11. The device of claim 9, wherein the actuator system is configured to move the elongated member to a third position between the first and second positions such that neither the compressible inlet tubing nor the compressible outlet tubing is pinched.

12. The device of claim 9, wherein the actuator arm comprises an electrically-operable solenoid.

13. The device of claim 9, wherein the first squeeze bar comprises an arcuate edge portion that is configured to pinch the compressible inlet tubing when the elongated member is moved in the distal direction.

14. The device of claim 9, wherein the second squeeze bar comprises an arcuate edge portion that is configured to pinch the compressible outlet tubing when the elongated member is moved in the proximal direction.

15. An automated in ovo injection apparatus, comprising:
a plurality of injection devices configured to inject fluid into a respective plurality of eggs;
a fluid source for holding fluid to be injected into the eggs; and
a fluid delivery system for delivering a predetermined dosage of fluid from the fluid source to each injection device, comprising:
  a frame;
  a plurality of syringes positioned adjacent the frame, each comprising:
    a barrel having proximal and distal ends;
    inlet and outlet ports in fluid communication with the barrel; and
    a plunger adapted for reciprocal movement within the barrel such that fluid is drawn into the barrel through the inlet port by a proximal motion of the plunger, and such that fluid is expelled from the barrel through the outlet port by a distal motion of the plunger;
  a plurality of elongated members mounted to the frame in adjacent, generally parallel relationship, wherein each elongated member is mounted for reciprocating movement along a longitudinal axis thereof, wherein each elongated member comprises:
    opposite proximal and distal ends;
    first and second passageways extending through the elongated member along a first direction that is substantially transverse to the elongated member longitudinal axis; and
    third and fourth passageways extending through the elongated member along a second direction that is substantially transverse to the elongated member longitudinal axis and to the first direction, wherein the first and third passageways are in communication, and wherein the second and fourth passageways are in communication;
  compressible inlet tubing extending through the third passageway in each of the elongated members, wherein the compressible inlet tubing is connected to the fluid source at one end and to a respective syringe inlet port at an opposite end;
  compressible outlet tubing extending through the fourth passageway in each of the elongated members, wherein the compressible outlet tubing is connected to a respective injection device at one end and to a respective syringe outlet port at an opposite end;
  a first squeeze bar extending through the first passageways of the elongated members, wherein the first squeeze bar is fixed relative to the elongated member;
  a second squeeze bar extending through the second passageways of the elongated members, wherein the second squeeze bar is fixed relative to the elongated member;
  an actuator system attached to each of the elongated members, wherein each actuator system is configured to move a respective elongated member along the longitudinal axis thereof between a first position wherein the compressible outlet tubing is pinched within the fourth passageway by the second squeeze bar so as to prevent the flow of fluid therethrough, and a second position wherein the compressible inlet tubing is pinched within the third passageway by the first squeeze bar so as to prevent the flow of fluid therethrough.

16. The apparatus of claim 15, wherein each actuator system comprises:
a spring attached to a respective elongated member, wherein the spring urges the respective elongated member along the longitudinal axis thereof in a proximal direction such that the compressible outlet tubing within the fourth passageway is pinched by the second squeeze bar so as to prevent the flow of fluid therethrough; and
an actuator arm attached to a respective elongated member that is configured to move the respective elongated member along the longitudinal axis thereof in a distal direction against a force imparted by a respective spring such that the respective compressible inlet tubing is pinched within the third passageway by the first squeeze bar so as to prevent the flow of fluid therethrough.

17. The apparatus of claim 15, wherein each actuator system is configured to move a respective elongated member to a third position between the first and second positions such that neither the respective compressible inlet tubing nor the compressible outlet tubing is pinched.

18. The apparatus of claim 15, wherein each actuator comprises an electrically-operable solenoid.

19. The apparatus of claim 15, wherein the first squeeze bar comprises an arcuate edge portion that is configured to pinch the compressible inlet tubing when the elongated member is moved in the distal direction.

20. The apparatus of claim 15, wherein the second squeeze bar comprises an arcuate edge portion that is configured to pinch the compressible outlet tubing when the elongated member is moved in the proximal direction.

21. A method of delivering a predetermined dosage of fluid to an egg injection device, the method comprising:
drawing fluid from a fluid source into a syringe barrel via inlet tubing in fluid communication with the fluid source and with the syringe barrel; and
dispensing a predetermined dosage of fluid from the syringe barrel to the egg injection device via outlet tubing in fluid communication with the egg injection device and with the syringe barrel;
wherein the outlet tubing is closed during the drawing step, and wherein the inlet tubing is closed during the dispensing step.

22. The method of claim 21, wherein the inlet and outlet tubing are compressible, and wherein the outlet tubing is closed during the drawing step by pinching the outlet tubing, and wherein the inlet tubing is closed during the dispensing step by pinching the inlet tubing.

23. A method of delivering a predetermined dosage of fluid into an egg, the method comprising:
drawing fluid from a fluid source into a syringe barrel via inlet tubing in fluid communication with the fluid source and with the syringe barrel;
inserting an injection device into an egg, wherein outlet tubing is in fluid communication with the injection device and with the syringe barrel and wherein the outlet tubing is closed so as to prevent the flow of fluid therethrough;

closing the inlet tubing;

opening the outlet tubing; and dispensing a predetermined dosage of fluid from the syringe barrel through the outlet tubing and into the egg via the injection device.

24. The method of claim 23, further comprising:

closing the outlet tubing;

opening the inlet tubing; and withdrawing the injection device from the egg.

25. The method of claim 23, wherein the inlet tubing is compressible and wherein the step of closing the inlet tubing comprises pinching the inlet tubing so as to prevent the flow of fluid therethrough.

26. The method of claim 23, wherein the outlet tubing is compressible and wherein the step of closing the outlet tubing comprises pinching the outlet tubing so as to prevent the flow of fluid therethrough.

27. The method of claim 23, further comprising:

opening the inlet and outlet tubing; and flushing the inlet and outlet tubing with sanitizing fluid.

28. A method of delivering a predetermined dosage of fluid to an egg injection device via a delivery device, wherein the delivery device includes an elongated member that is configured to reciprocate along a longitudinal axis thereof, wherein the elongated member includes opposite proximal and distal ends, an intermediate portion between the proximal and distal ends, first and second passageways extending through the elongated member intermediate portion along a first direction that is substantially transverse to the elongated member longitudinal axis, and third and fourth passageways extending through the elongated member intermediate portion along a second direction that is substantially transverse to the elongated member longitudinal axis and to the first direction, wherein the first and third passageways and the second and fourth passageways are in respective communication, wherein a first squeeze bar extends through the first passageway, and wherein a second squeeze bar extends through the second passageway; the method comprising:

drawing fluid from a fluid source into a syringe barrel via compressible inlet tubing in fluid communication with the fluid source and with the syringe barrel, wherein the compressible inlet tubing extends through the third passageway; and dispensing a predetermined dosage of fluid from the syringe barrel to the egg injection device via compressible outlet tubing in fluid communication with the egg injection device and with the syringe barrel, wherein the compressible outlet tubing extends through the fourth passageway;

wherein, substantially simultaneously with the drawing step, the compressible outlet tubing is closed by proximal movement of the elongated member such that the second squeeze bar pinches the compressible outlet tubing so as to prevent the flow of fluid therethrough; and wherein, substantially simultaneously with the dispensing step, the compressible inlet tubing is closed by distal movement of the elongated member such that the first squeeze bar pinches the compressible inlet tubing so as to prevent the flow of fluid therethrough.

29. The method of claim 28, wherein the delivery device includes an actuator system attached to the elongated member that is configured to move the elongated member along the longitudinal axis thereof, and wherein substantially simultaneously with the drawing step, the actuator system proximally moves the elongated member to a first position such that the second squeeze bar pinches the compressible outlet tubing so as to prevent the flow of fluid therethrough.

30. The method of claim 29, wherein substantially simultaneously with the dispensing step, the actuator system distally moves the elongated member to a second position such that the first squeeze bar pinches the compressible inlet tubing so as to prevent the flow of fluid therethrough.

31. The method of claim 30, further comprising:

moving the elongated member to a third position via the actuator system to open the inlet and outlet tubing; and flushing the inlet and outlet tubing with sanitizing fluid.

32. A method of delivering a predetermined dosage of fluid to an egg injection device via a delivery device, the method comprising:

drawing fluid from a fluid source into a syringe barrel via inlet tubing in fluid communication with the fluid source and with the syringe barrel; and dispensing a predetermined dosage of fluid from the syringe barrel to the egg injection device via outlet tubing in fluid communication with the egg injection device and with the syringe barrel;

wherein, substantially simultaneously with the drawing step, the outlet tubing is closed so as to prevent the flow of fluid therethrough; and wherein, substantially simultaneously with the dispensing step, the inlet tubing is closed so as to prevent the flow of fluid therethrough.

33. The method of claim 32, wherein the outlet tubing is closed by a first valve, and wherein the inlet tubing is closed by a second valve.

34. The method of claim 33, wherein the inlet and outlet tubing are compressible, and wherein the first and second valves are pinch valves.

35. The method of claim 32, wherein the inlet and outlet tubing are compressible, and wherein the outlet tubing is closed by a first end portion of a rocker arm and wherein the inlet tubing is closed by an opposite second end portion of the rocker arm.

* * * * *